United States Patent [19]

Baka et al.

[11] Patent Number: 5,636,675

[45] Date of Patent: Jun. 10, 1997

[54] SHIFTING ROLL AWNING ASSEMBLY WITH STOWABLE SUPPORT ARMS

[75] Inventors: Gregory J. Baka, Kendallville; Dale G. Malott, Middlebury, both of Ind.

[73] Assignee: White Consolidated Industries, Inc., Cleveland, Ohio

[21] Appl. No.: 496,201

[22] Filed: Jun. 28, 1995

Related U.S. Application Data

[63] Continuation-in-part of Ser. No. 159,083, Nov. 29, 1993.

[51] Int. Cl.⁶ .................................................. E04F 10/06
[52] U.S. Cl. .............................................. 160/67; 160/71
[58] Field of Search ................................. 160/80, 22, 46, 160/66, 71, 68, 74, 75, 65, 78, 82, 67; 135/88.1

[56] References Cited

U.S. PATENT DOCUMENTS

| | | |
|---|---|---|
| 4,068,673 | 1/1978 | Bernardi . |
| 4,077,419 | 3/1978 | Lux . |
| 4,171,013 | 10/1979 | Clark . |
| 4,188,964 | 2/1980 | Greer . |
| 4,253,689 | 3/1981 | McKee ........................ 160/67 X |
| 4,640,332 | 2/1987 | Turner . |
| 4,658,877 | 4/1987 | Quinn . |
| 4,719,954 | 1/1988 | Curtis et al. . |
| 4,754,774 | 7/1988 | Leader . |
| 4,801,119 | 1/1989 | Pelletier . |
| 5,044,416 | 9/1991 | Turner . |
| 5,170,811 | 12/1992 | Kirk et al. . |
| 5,174,352 | 12/1992 | Murray et al. . |
| 5,192,111 | 3/1993 | Hanemaayer . |

FOREIGN PATENT DOCUMENTS

| | | |
|---|---|---|
| 45348 | 4/1935 | France . |
| 413311 | 12/1966 | Switzerland . |

Primary Examiner—Blair Johnson
Attorney, Agent, or Firm—Pearne, Gordon, McCoy & Granger LLP

[57] ABSTRACT

An improved awning assembly for a recreational vehicle has the awning rolled around a roller tube and stowed against a wall. Support arms pivot upwardly to a stowed and latched position parallel with the roller tube and pivot downwardly therefrom. The support arms are attached to hooks or a latching assembly on the vehicle. Rafter arms slide in a channel at the wall and are positioned to tension the awning. The awning provides a compact and attractive assembly in the stowed position and is easily erected by one person.

15 Claims, 9 Drawing Sheets

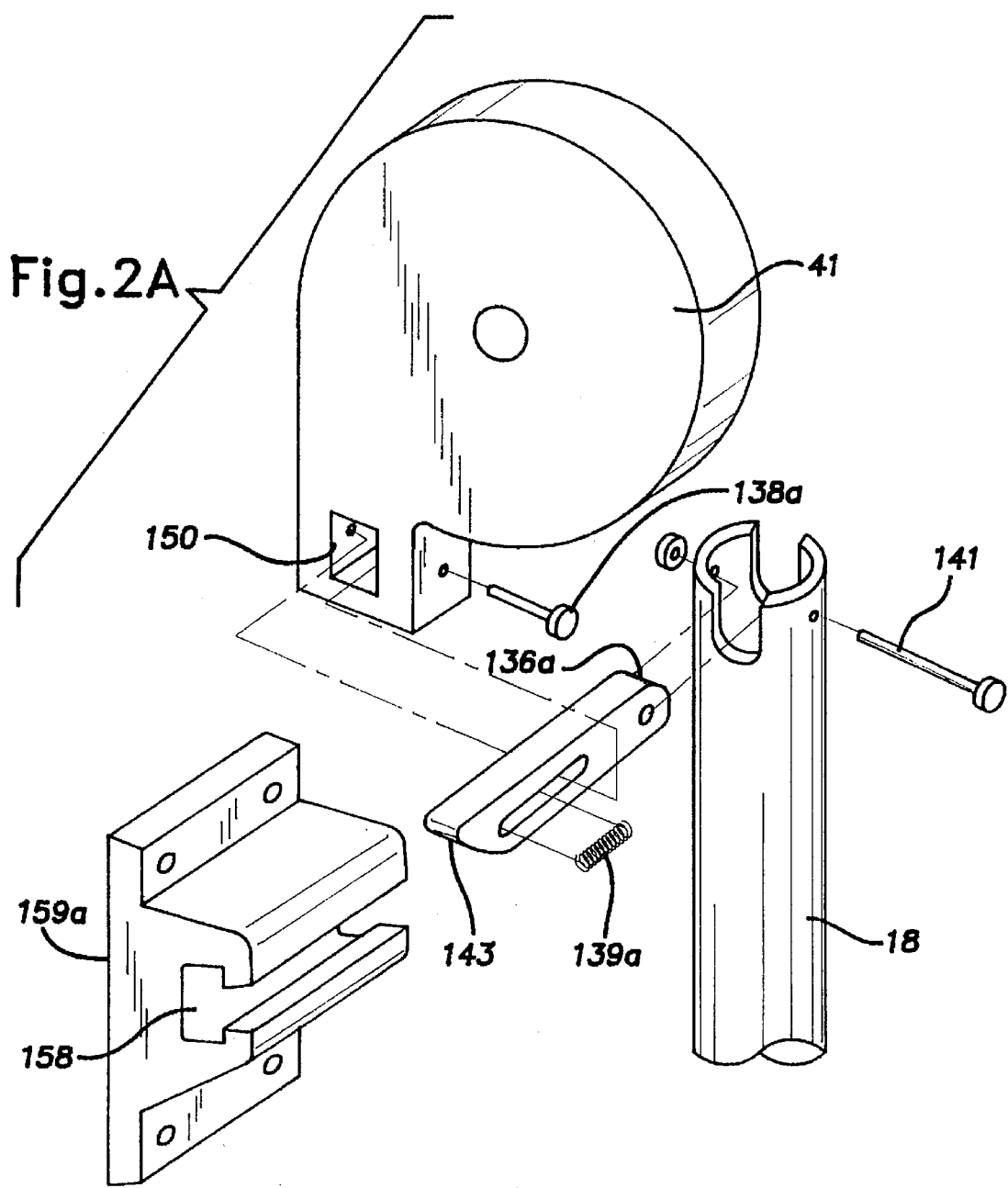

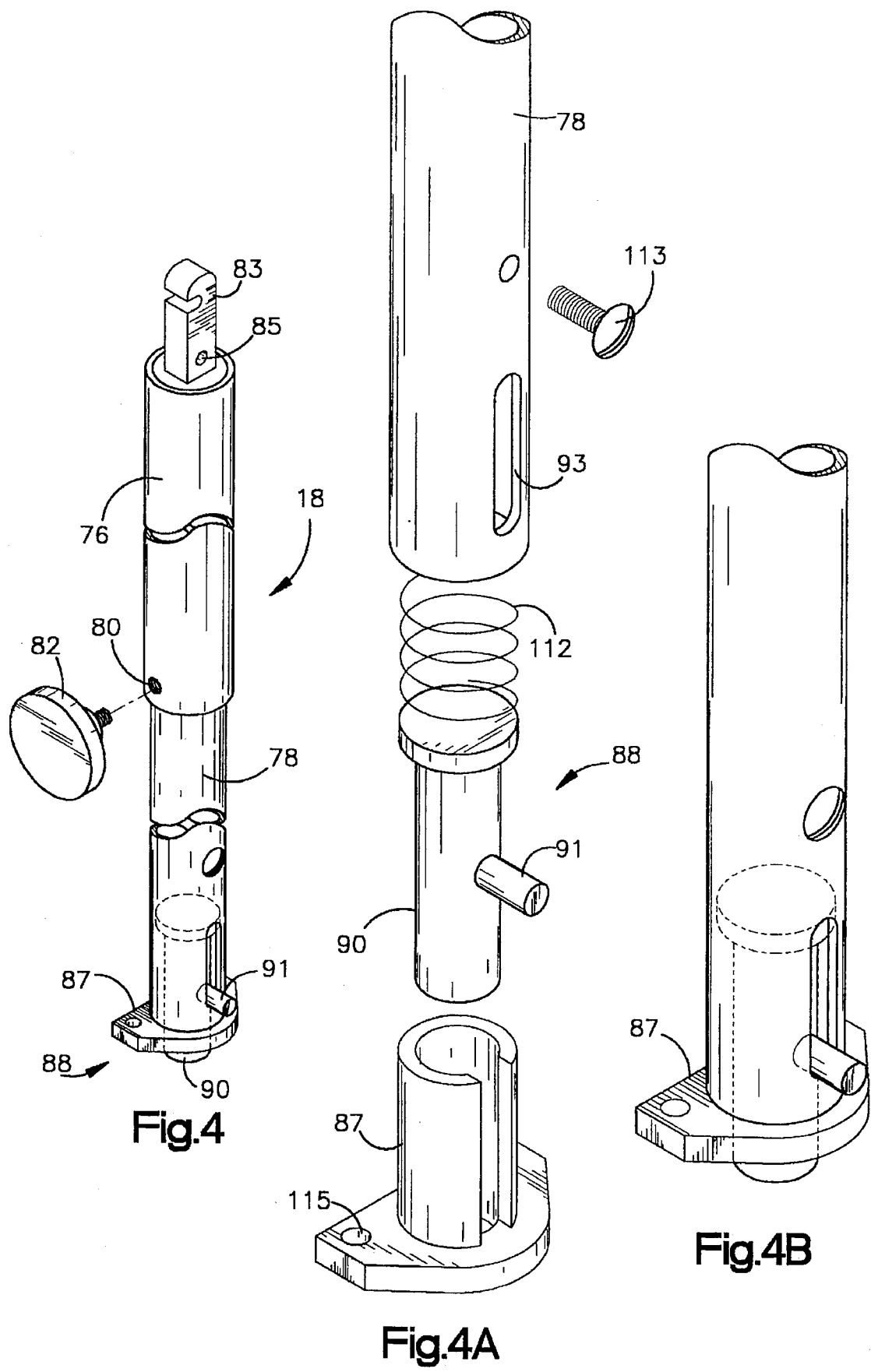

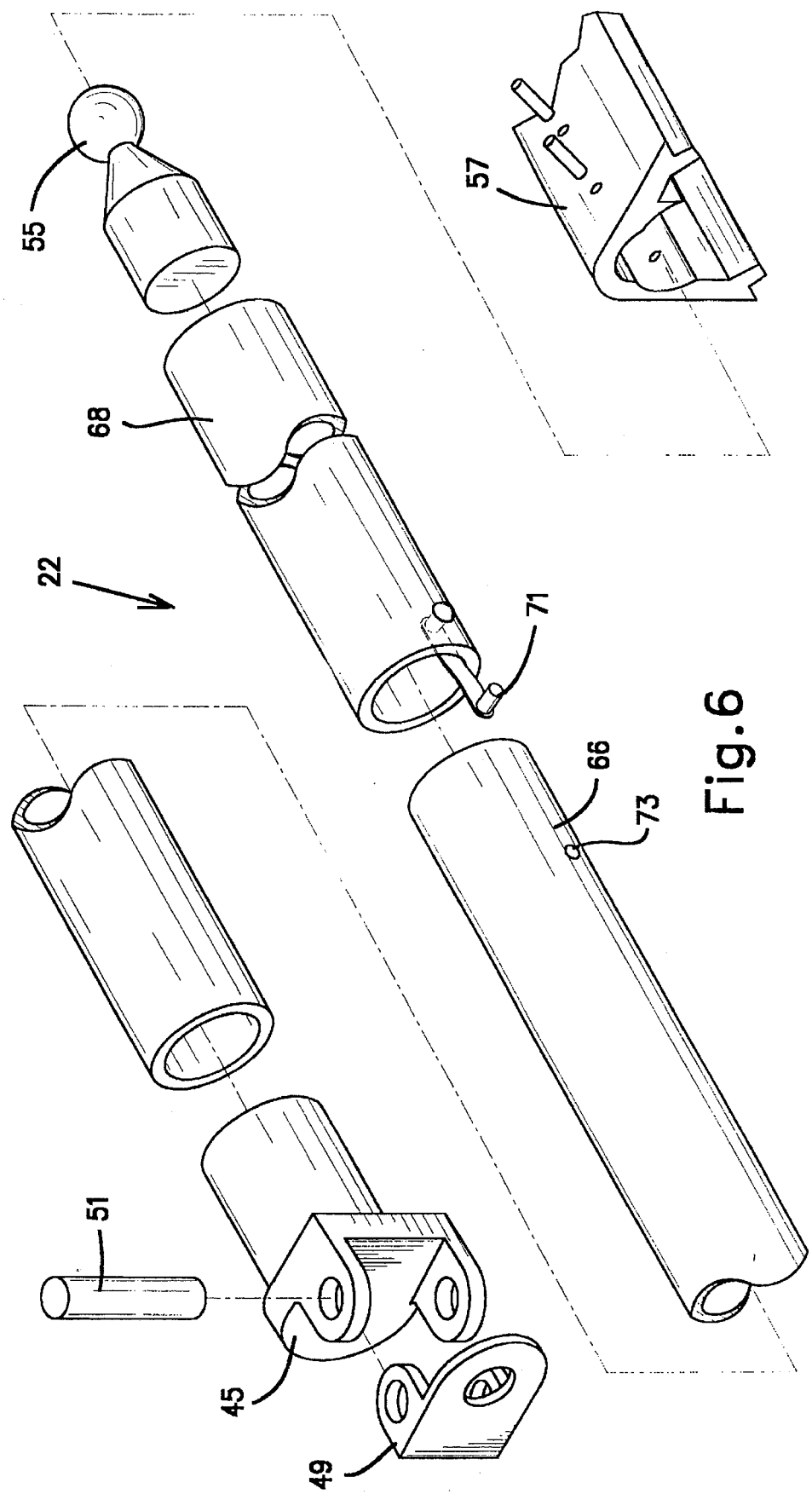

SHIFTING ROLL AWNING ASSEMBLY WITH STOWABLE SUPPORT ARMS

This is a continuation-in-part of application Ser. No. 08/159,083, filed Nov. 29, 1993.

BACKGROUND OF THE INVENTION

1. Field of the Invention

This invention relates generally to the field of awnings and specifically to a retractable and stowable support assembly therefor.

2. Description of the Related Art

There are a number of known retractable assemblies that support an awning to create a sheltered area. The awning is usually supported in a generally horizontal position with a slight slope to facilitate runoff of rainwater. Commonly, one edge of the awning is attached to a wall. The opposite edge is attached to a tube, rod, rail or other similar elongated member, which is supported by two support arms. The support arms rest on the ground or are mounted to a lower part of the wall. Tension rafter arms are disposed between the wall and the tube or rail to stretch the awning and hold it in position. In this way, a convenient shelter is formed adjacent the wall to protect people and objects beneath the wall from rain and direct sun.

Retractable awnings can be divided into two general classes. Box type awnings have a stationary roller tube mounted to the wall. The awning is rolled around the tube for storage. The box comprises a stationary enclosure for the awning, a cover of which is opened to permit access to the awning which is unrolled to an extended position. Alternatively, a movable cover is attached to the free end of the awning to complete the enclosure when the awning is retracted. U.S. Pat. Nos. 4,171,013 to Clark; 4,754,774 to Leader; 5,170,811 to Kirk; 5,192,111 to Hanemaayer show examples of such awning assemblies.

Shifting roll type awnings have a roller tube suspended between the support arms. The tube is moved laterally to unroll or roll the awning on the tube. One edge of the awning is rigidly attached to the wall. It is less common, but still possible, for this type of awning to be enclosed in a case in its retracted position. U.S. Pat. Nos. 4,188,964 to Greer; 4,658,877 to Quinn; 4,719,954 to Curtis; 4,801,119 to Pelletier; 5,174,352 to Murray show examples of such awning assemblies. In both types, the roller tube may be spring balanced or spring biased to aid rolling.

A popular application for such awnings is on recreational vehicles. The awning creates a convenient outdoor shelter next to the vehicle. Simple and fast assembly and disassembly of the awning are important, especially in vehicle applications. Vehicle awnings also must be rugged and durable because they are constantly exposed to the elements. Aside from functioning efficiently, the awning should also be aesthetically attractive in its installed and retracted positions. A minimum amount of hardware should be exposed during travel to provide a durable and attractive unit.

SUMMARY OF THE INVENTION

The present invention provides an improved awning assembly that is more closely related to the shifting roll type awnings described above. The basic assembly includes an elongated, horizontally movable roller extending generally horizontally along a generally vertical wall. An awning has a leading edge attached to the roller and a trailing edge attached to the wall. The awning is rolled on the roller and adapted to be unrolled from the roller to an extended position. A pair of rafter arms disposed between the leading edge and the trailing edge are adapted to hold the roller a selected distance from the wall when the awning is extended. A pair of support arms are pivotably attached to the roller and adapted to support the leading edge when the awning is extended.

The improvements include the rafter arms being telescoping and lockable in an extended position. The rafter arms are pivotably mounted at the roller for pivoting movement about horizontal and vertical axes. A slider is disposed on an end of each rafter arm and disposed in a slide channel at the wall so as to slide in the channel when the awning is extended or retracted. The rafter arms are provided with locks to prevent separation of rafter arm components during extension. The support arms are pivotable so as to be stowable in a generally horizontal stowed position adjacent the roller.

A rigid or flexible elongated awning shield can be disposed between the trailing edge of the awning and the wall, said shield being hingedly attached to the wall so as to at least partially cover the awning when the awning is retracted and lay generally horizontally when the awning is extended.

A pair of hooks are disposed on the wall below the roller. A foot of each support arm is provided with a hole to receive the corresponding hook therein so as to support the support arm on the wall. A latch bar is slidingly disposed in each support arm and biased toward the lower end, said latch bar projecting from the foot and adapted to engage pockets located on the wall adjacent the roller. The latch bar is movable to a retracted position so as to permit the latch bar to be removed from the pocket so the support arm can be lowered.

The roller is mounted on a generally vertical wall, and assembly steps include:

retracting the latch bar and releasing the lower end of one support arm from the generally horizontal, stowed position;

pivoting the support arm down to a generally vertical position;

securing the foot on the lower end of the support arm on the hook disposed on the wall below the roller tube;

repeating these steps for the other support arm;

pulling the roller from the wall so as to unroll the awning from the roller, and so as to extend the rafter arms disposed between the wall and the lead rail; and pivoting the rafter arms to a position generally perpendicular to the lead rail so as to tension the awning.

Additional steps include detaching one support arm from its foot and positioning the one support arm on a generally horizontal surface so as to support the awning and detaching the other support arm from its foot and positioning the other support arm on a generally horizontal surface so as to support the awning.

The awning is easily mounted to a wall or recreational vehicle to provide a compact, attractive appearance. Erection of the awning is simple enough to be accomplished by one person to provide a sturdy and versatile shelter.

BRIEF DESCRIPTION OF THE DRAWINGS

FIG. 1A shows a detail of FIG. 1;

FIGS. 2A, 2B and 2C show alternative embodiments of end sections of the awning assembly shown in FIG. 2;

FIG. 4 shows a perspective view of a support arm;

FIG. 4A shows an exploded detail view of a lower end of the support pole;

FIG. 4B shows the assembled support pole of FIG. 4A;

FIG. 6 shows an exploded view of a rafter arm.

DESCRIPTION OF THE PREFERRED EMBODIMENTS

Figure 1:
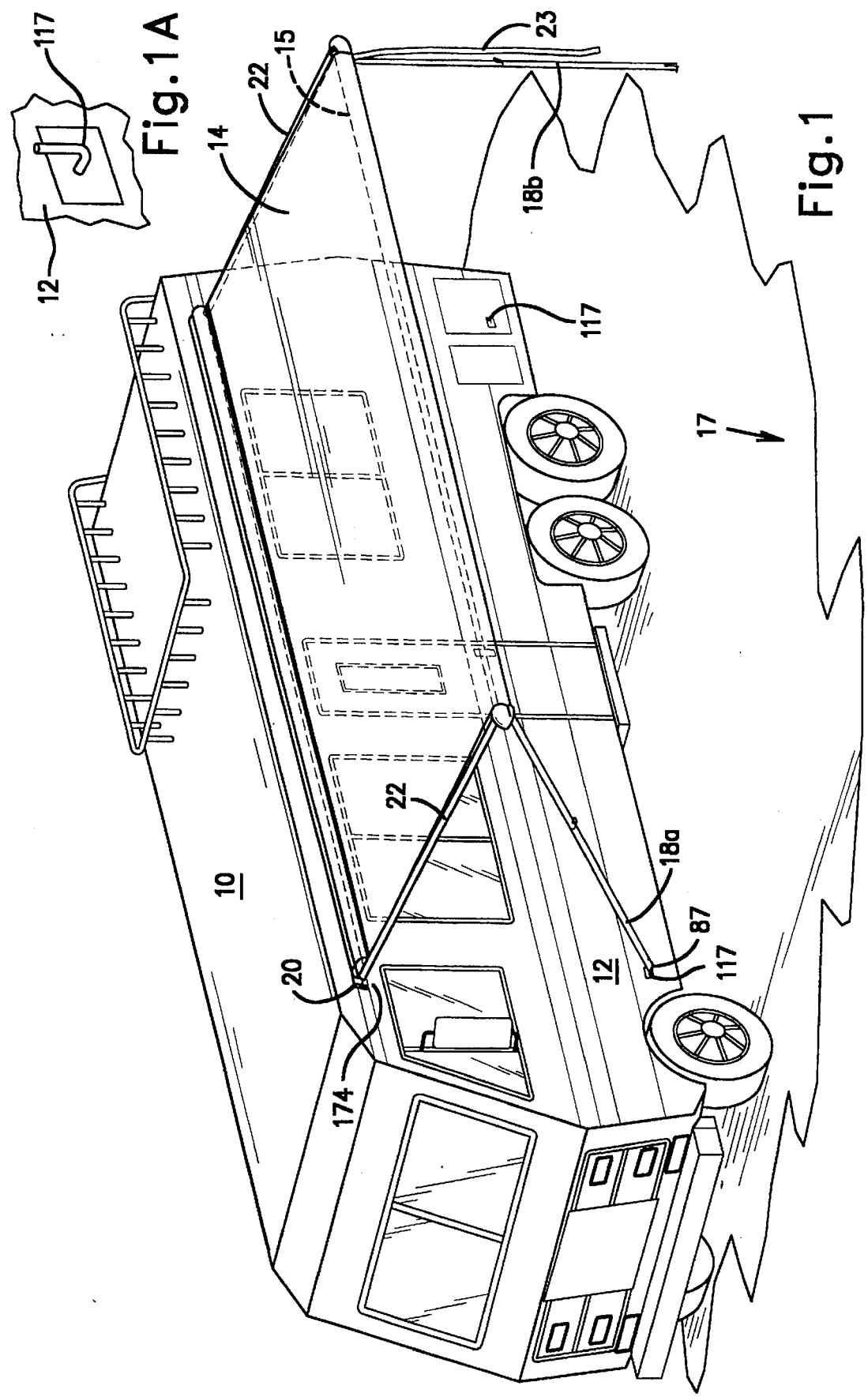
FIG. 1 shows a perspective view of a recreational vehicle having an awning assembly according to the present invention.

Referring to FIG. 1, a recreational vehicle 10 has a generally vertical wall 12. The wall 12 could be that of a building or other stationary or mobile structure. The present description is directed to a vehicle. An awning 14 is mounted to the wall 12 so as to be suspended in a generally horizontal manner to form a shelter adjacent the wall 12. The awning is made from vinyl, canvas, or other materials as is known in the art. A leading edge of the awning 14 is fastened to a roller, such as a roller tube 15, supported above a surface 17 adjacent the wall 12 on a pair of support arms 18, which will be further described below. A case assembly 20 is mounted on the wall 12 at a desired height for the awning 14. A pair of rafter arms 22 are disposed between the wall 12 and the roller tube 15 to hold the awning in tension. A pull strap 23 is secured in a channel of the roller tube 15. The pull strap 23 is adapted to be rolled with the awning 14 and is used to unroll the awning. The strap can be slid to the center and either end of the roller tube 15.

Figure 3:
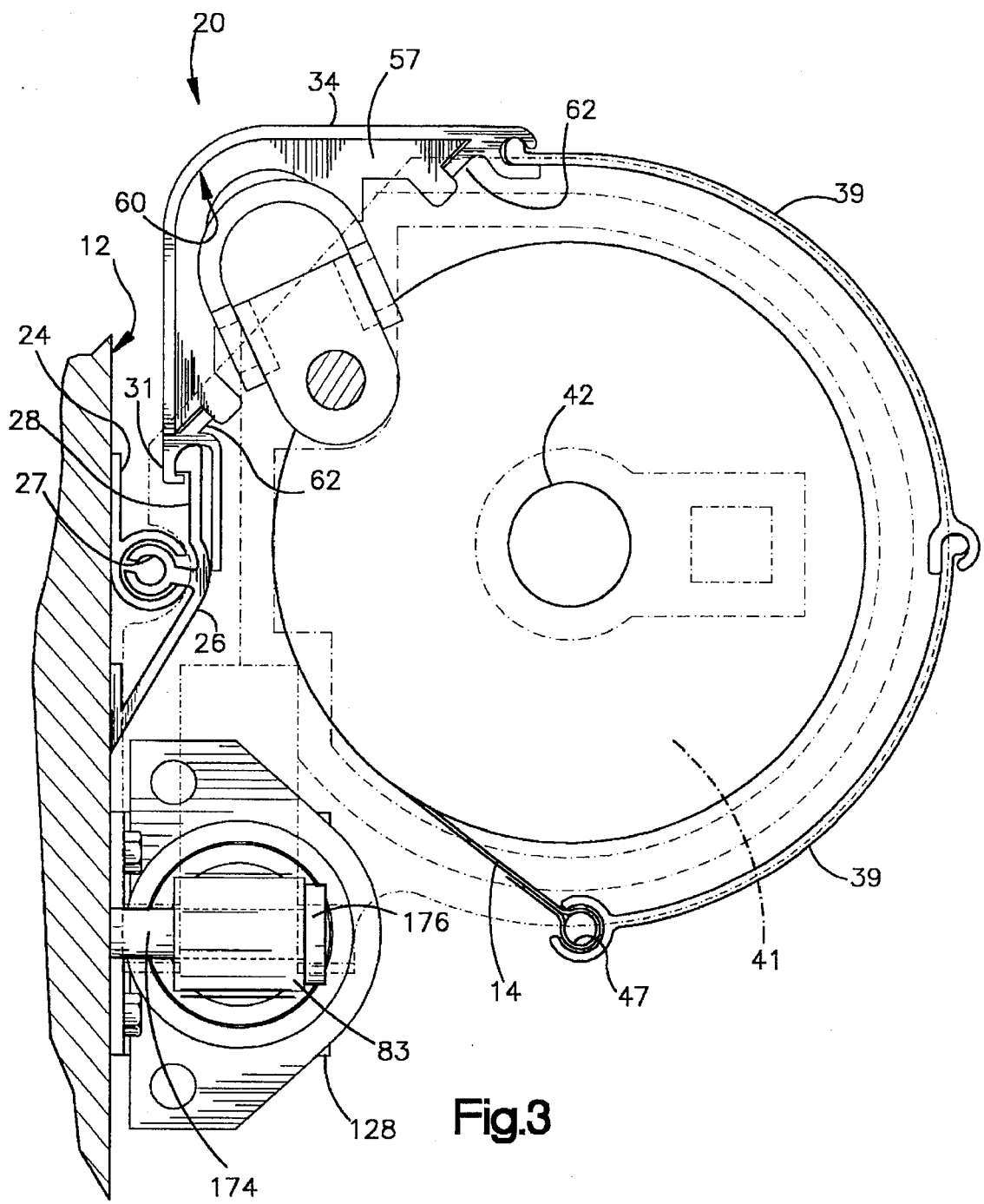
FIG. 3 shows an end view of the awning in a stowed position with an end cap removed for clarity.

Referring to FIG. 3, an awning rail 24 including a "C" channel is securely fastened to the wall 12. Awning rails of the type shown are commonly found on recreational vehicles. The case assembly 20 includes a pair of rail hooks 26, one disposed near each end of the case assembly. The rail hook 26 includes a generally cylindrical rail 27 or ball received in the "C" channel of the awning rail 24. The rail hook 26 may be secured in place by one or more lag screws. Alternatively, the rail 27 may be omitted and additional lag screws or other fasteners may be used. An upward projection 28 of each rail hook 26 supports an elongated case 34. The upward projection 28 engages a hook 31 of the case 34. The case 34 shown is adapted for simple mounting on the awning rail 24 by means of the rail hooks 26, but could be mounted directly to the wall by various means which will be apparent to one skilled in the art.

The awning 14 is fastened to the case 34 with a pair of rigid or flexible slats 39 and rolled on the roller tube 15. The slats 39 are hingedly connected to the case 34 and awning 14 by tongue-in-groove arrangements so that the slats form a protective cover over the rolled awning 14. The roller tube is counter-balanced in rotation by a spring mechanism of a type known in the art. The awning can be rolled onto and unrolled from the roller tube with a minimum effort. The roller tube 15 is supported at each end on an axle 42 extending through an end cap 41.

Figure 3A:
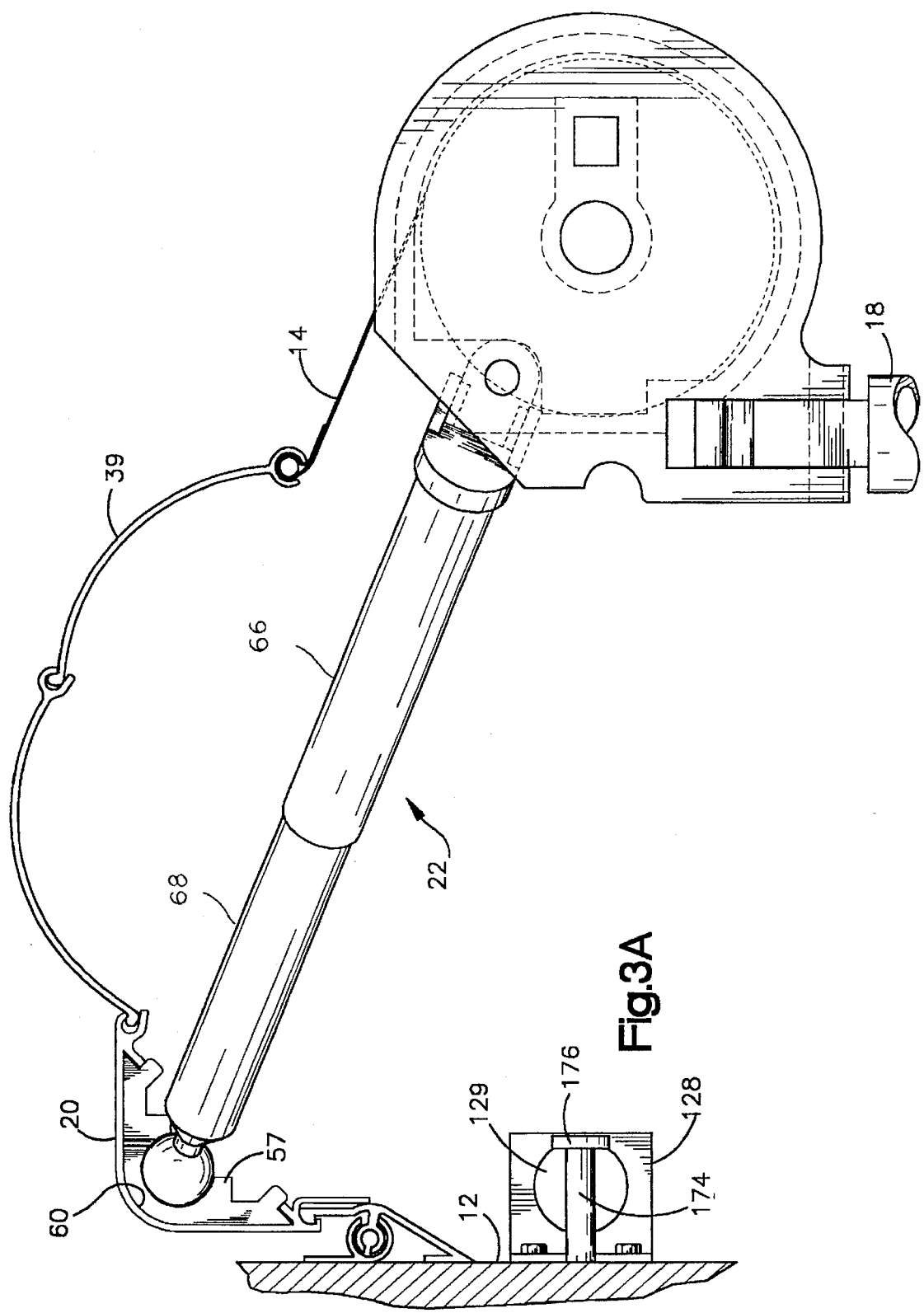
FIG. 3A shows an end view of the awning assembly in a partially extended position.

The awning may be attached directly to the case 34 or, as shown, a rod 47 sewn into the awning is received in a "C" channel of the slat 39. The slats are preferably a rigid, protective cover of aluminum, for example, and curved to conform generally to the awning 14 rolled on the roller tube 15. When the awning is in an extended or unrolled position, the slats pivot to a generally horizontal position, as shown in FIGS. 1 and 3A.

Figure 2:
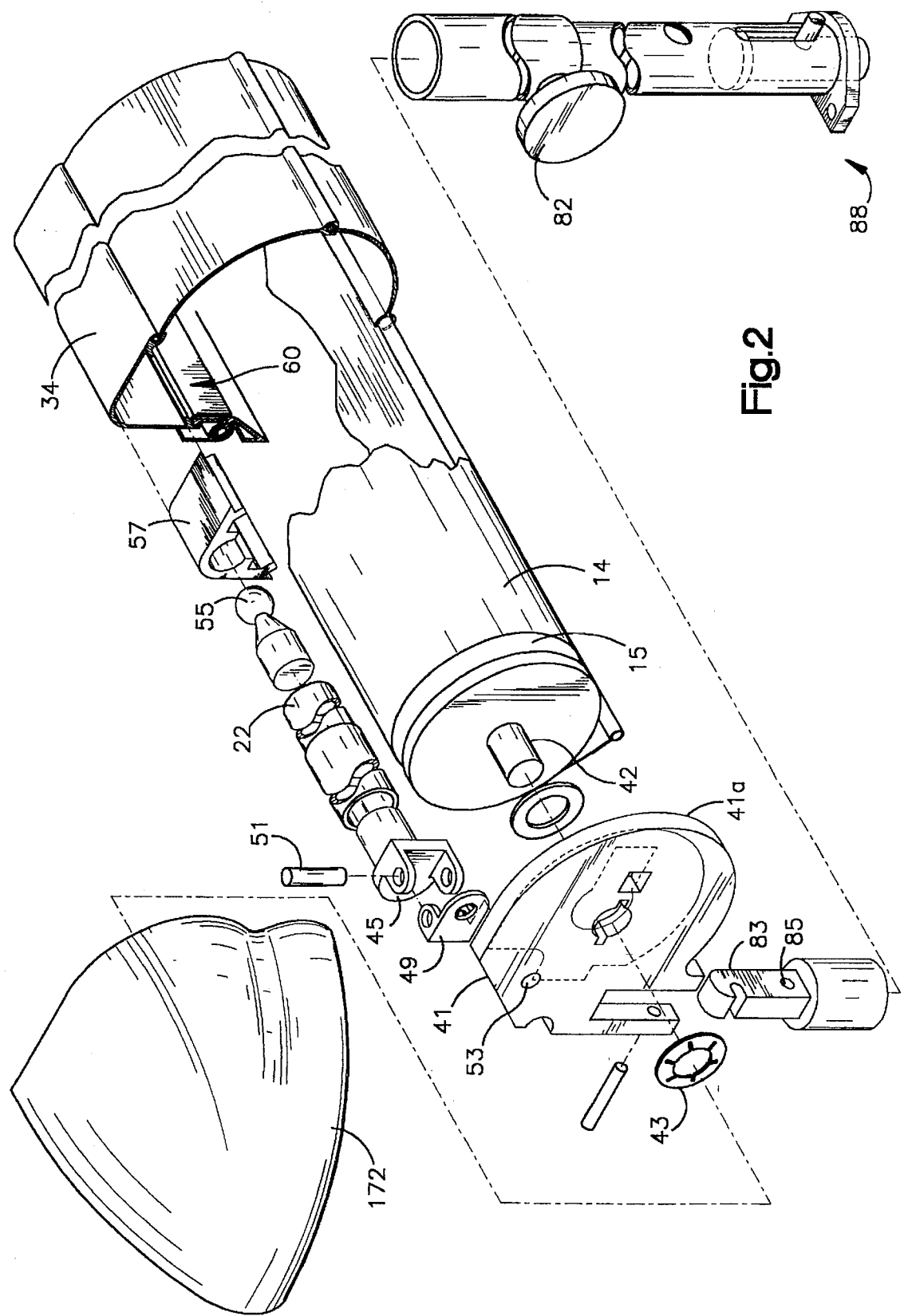
FIG. 2 Shows an exploded detail view of the awning in a retracted position.

Referring to FIG. 2, the end cap 41 comprises a rigid member having a generally central opening through which the axle 42 extends. The axle 42 is locked in place by a lock washer 43. The end cap 41 has a generally circular part 41a conforming to the cross section of the roller tube 15.

One of the rafter arms 22 is secured to the end cap 41 by a pivot assembly including a pivot 45 installed in an outer end of the rafter 22 and secured by a screw. The pivot 45 is pivotably attached to a rafter mount 49 by a rafter pin 51. The rafter mount 49 is mounted on the end cap 41 at a rafter mounting hole 53 by a rivet or other fastener. The pivot assembly permits universal rotation of the rafter arm about vertical and horizontal axes.

The inner end of the rafter arm 22 is provided with a ball 55. The ball 55 is received in a socket of a slide 57 and secured by a pair of pins inserted through the slide. The slide 57 is made of nylon or other low friction material. As shown also in FIG. 3, the slide 57 is slidably received in a slide channel 60 and retained by a pair of retainer flanges 62. The ball 55 permits universal rotation of the rafter arm 22 about three orthogonal axes relative to the slide 57 and channel 60.

Referring to FIGS. 6 and 3A, the rafter arm 22 has an outer rafter 66 telescoping on an inner rafter 68 lockable in an extended position by a lock, such as a snap button 71, for example. When the awning is unrolled to its extended position, the slides 57 slide in the slide channel 60 so that the rafter arms extend to a locked, extended position and pivot from a position generally parallel with the roller tube 15 to a position nearly orthogonal to the roller tube. The snap button 71 engages in a hole 73 and prevents the outer and inner rafters 66, 68 from separating. The pivot assembly 45, 49, 51 and ball 55 prevent binding of the rafter arms 22 during extension. The rafter arms 22 are manually pivotable to an orthogonal position relative to the roller tube so as to bias the awning toward its extended position and maintain tension on the awning, as shown in FIGS. 1 and 3A.

Referring to FIG. 4, each support arm 18 includes an lower arm 78 telescoping inside an upper arm 76. The arms are preferably hollow and generally circular in cross-section. Other constructions and cross sections are also suitable, many of which are known in the art. The upper arm 76 has a support hook 83. The support arm 18 is pivotably attached to the end cap 41 by a pin through a hole 85 in the hook 83, as shown in FIG. 2. The relative position of the upper arm 76 on the lower arm 78 can be selectively locked by a known device, such as a screw clamp 80 operated by a knob 82. Alternatively, a lever clamp or a plurality of holes adapted to receive a snap button or latch projection can be used. A foot 87 and latch bar assembly 88 are disposed on the lower end of the lower arm 78.

Referring to FIGS. 4A and 4B, the latch bar assembly 88 includes a latch bar 90 received within the lower end of the lower arm 78. A post 91 extends through a slot 93 in the lower arm 78. The post is adapted to be received in an end of an operating pole 104 (FIG. 5) used to retract the latch bar 90. The latch bar 90 extends outwardly from the foot 87. The foot 87 is provided with a hole 115 adapted to receive a hook 117 on the wall 12, as shown in FIG. 1. and 1A. The hook 117 supports the support arm 18a. The latch bar 90 is biased downwardly by a spring 112 compressed, for example against a screw 113.

The rafter arms 22 and support arms 18 are described as telescoping arms. However, other configurations of adjustable length arms, such as side-by-side sliding members, would be suitable.

Referring to FIG. 1, two hooks 117 (FIG. 1A) are mounted to the wall 12 below and near each end of the roller 15, as shown in FIG. 1. The support arm 18 can be pivoted from a generally horizontal orientation (shown in FIG. 5) to an angled position (18a in FIG. 1). In addition, the foot 87 can be removed from the hook 117 and pivoted so that the foot is placed on the ground surface 17 to support the support arm 18b, as shown in FIG. 1.

Figure 5:
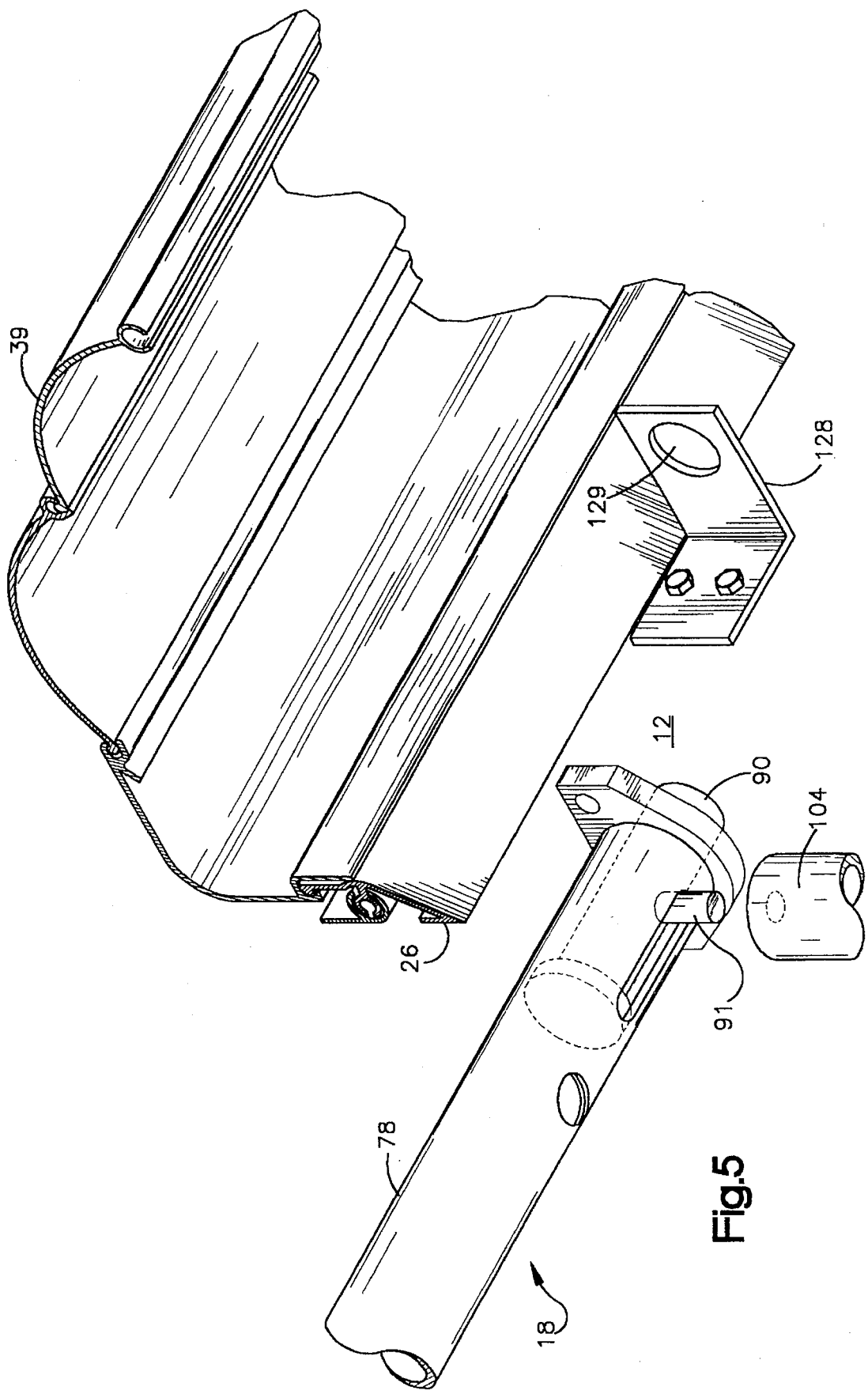
FIG. 5 shows a partial perspective view looking upwardly at the awning cover and support pole.

Referring to FIG. 5, a pair of pockets 128 are disposed on the wall 12 or fastened to the case 34. Each pocket 128 has an opening 129 adapted to receive the projecting latch bar 90. When the latch bar 90 is retracted by hand or with the pole 104, as discussed above, the latch bar clears the opening 129 to permit removal of the support arm 18 from the horizontal position.

As shown in FIGS. 1 and 2, a decorative plastic end cover 172 is provided on each end cap 41 to enclose and protect the parts.

The entire awning assembly is easily installed on a new or existing wall. The case assembly 20 is mounted to the wall 12 and the hooks 117 are mounted to the wall below the ends of the case assembly 20. The support hooks 83 extend horizontally from the end caps 41 and rest on bolts or pins 174 extending horizontally from the wall 12 or case 20, as shown in FIG. 3. A head 176 of each pin 174 retains the roller tube 15 in the retracted position. The awning assembly is then ready for erection as described below.

Referring to FIG. 2A, the support arm 18 is mounted to the end cap 41 by a lock bar 136a. The lock bar 136a is slidingly received in a passage 150 or bore through the end cap 41. The lock bar 136a is retained in the passage 150 by a retainer pin 138a and is biased outwardly by a compression spring 139a braced against the pin 138a. The support arm 18 is pivotably mounted to the lock bar 136a by a pivot pin 141. A nose 143 of the lock bar 136a projects outwardly from the passage 150 and is engageable in a lock socket 158 of a lock bracket 159a mounted to the wall of the vehicle. The spring 139a biases the nose 143 into engagement with the lock socket 158 to retain the end cap 41 and the roller against the wall. The nose is disengageable by moving the support arm inwardly.

Figure 2B:
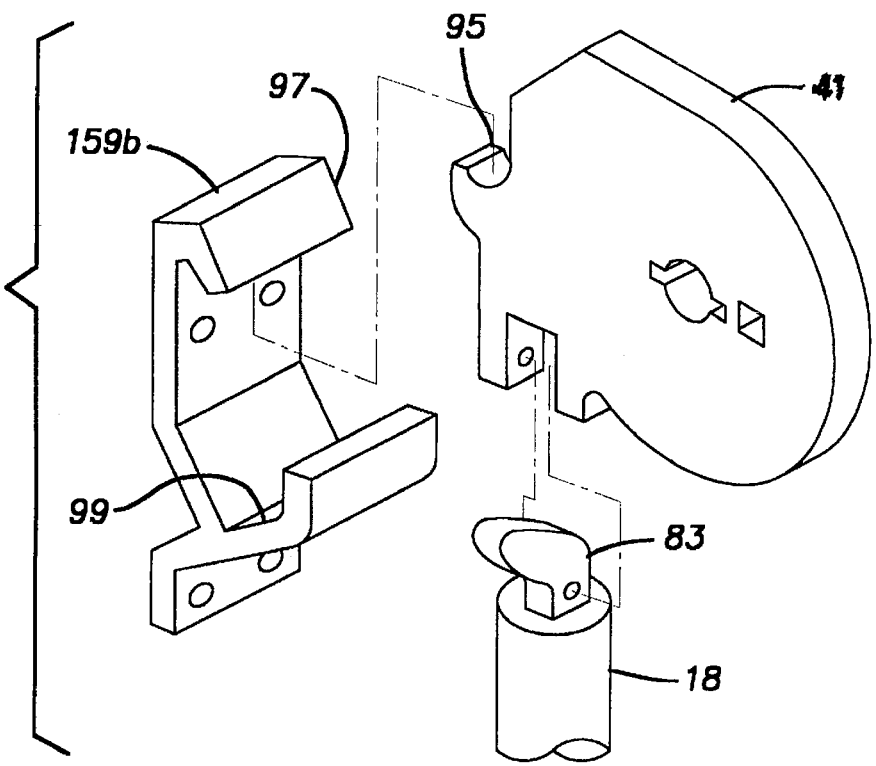

Referring to FIG. 2B, the end cap 41 is provided with an upwardly curved end cap hook 95 adapted for mating with a downwardly curved bracket hook 97. The bracket hook 97 is defined by an upper projection from a lock bracket 159b mounted to the wall. A lower ledge 99 of the bracket 159b defines a support surface for the support hook 83 of the support arm 18 when the arm 18 is in a horizontal position. The ledge 99 and hooks 83, 95, 97 are disposed so that, as the support arm 18 is pivoted to its horizontal position, the support hook 83 engages against the ledge 99 and lifts the end cap hook 95 into engagement with the bracket hook 97, thereby retaining the end cap 41 and roller against the wall of the vehicle.

Figure 2C:
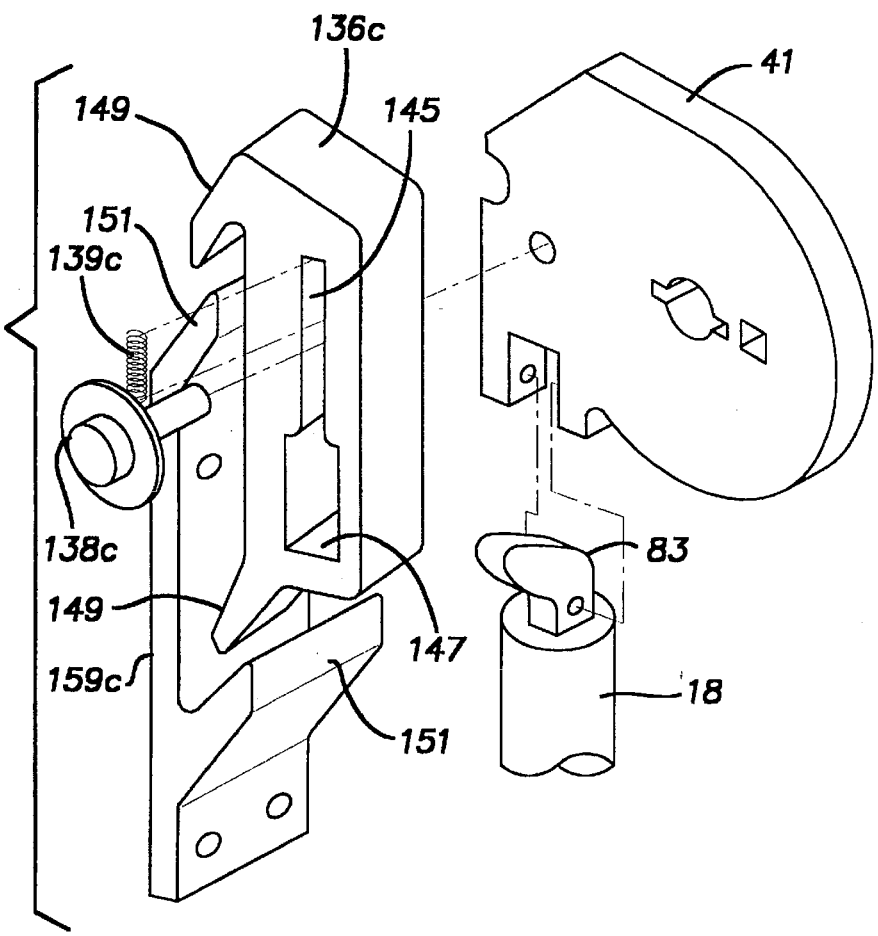

Referring to FIG. 2C, a lock bar 136c is mounted for vertical sliding movement on an outside face of the end cap 41. The lock bar 136c is retained on the end cap by a pin or bolt 138c extending through a slide channel 145 of the lock bar. The lock bar is biased upwardly by a spring 139c. A wall 147 of the lock bar 136c is adapted for engagement by the support hook 83 of the support arm 18. Downwardly curved lock bar hooks 149 are provided on the lock bar 136c and adapted for engaging upwardly curved bracket hooks 151 projecting from a bracket 159c mounted to the vehicle wall. Pivoting the support arm 18 to a horizontal position causes the support hook 83 to engage against the wall 147 of the lock bar 136c, which causes the lock bar to slide downwardly, thereby engaging the lock bar hooks 149 with the bracket hooks 151 and retaining the end cap 41 and roller against the wall of the vehicle.

Mirror image configurations of the end caps 41, brackets 159 and support arms 18 are provided at the opposite end of the roller.

Except where otherwise noted, the parts can be made from aluminum or other suitable rigid materials. Light weight is preferred for vehicle applications.

In operation, referring first to FIG. 5, a hollow end of a pole 104 is placed on the post 91 of one of the support arms 18. The pole is shifted to release the latch bar 90 from the opening 129 of the pocket 128 thereby releasing the support arm 18. The support arm 18 is pivoted downwardly to a generally vertical position. In the embodiments of FIGS. 2, 2B and 2C, pivoting the support arms downwardly automatically releases the roller from its locked position against the wall. In the FIG. 2A embodiment, the support arms are shifted inwardly to release the roller. The lower arm 78 is extended, and the foot 87 is placed on the hook 117 and locked in place with the knob 82. The other arm 18b is then released and locked on its corresponding hook 117 in a similar manner. As the support arms 118 are pivoted downwardly, the support hooks 83 disengage from the pins 174 to release the roller tube.

The pull strap 23 (FIG. 1) is pulled to extend the awning, to the position shown in FIG. 3A and then to the position in FIG. 1. As the awning is extended, the rafter arms 22 also extend and lock and the slides 57 move outwardly in the slide channel 60. The rafter arms are then manually moved to a position generally perpendicular to the roller tube 15 to provide tension on the awning 14, as shown in FIG. 1.

To place the awning at a desired angle and height, each of the support arms 18 is adjusted to a desired length by turning the knob 82 to loosen the screw clamp. The support arm is extended and the screw clamp is tightened at the desired length. If desired, the awning can be left in this position with the support arms secured to the wall 12, as shown for support arm 18a in FIG. 1. Alternatively, the support arm can be released from the wall by lifting the foot 87 off the hook 117. The support arm 18 is pivoted away from the wall to a generally vertical position and the foot 87 rests on the ground or other surface 17, as shown for support arm 18b in FIG. 1. The length of the support arm can be adjusted with the knob 82, as described above, if desired.

To store the awning for travel, the steps recited above are reversed. Each foot 87 is placed on its corresponding hook 117. Each support arm is shortened by releasing its screw clamp 80 and then tightening it again in the shortened position. The rafter arms 22 are manually slid out of the perpendicular position and unlocked by depressing the snap buttons 71. The roller tube 15 is pushed until the awning 14 is fully retracted. As the awning is retracted, the rafter arms 22 slide inwardly to the parallel position. As shown in FIG. 3, the rafter arms are stowed between the roller tube 15 and wall 12 and above a longitudinal axis of the roller tube 12, thereby efficiently utilizing space in the case assembly 20.

One support arm is removed from its hook 117 by loosening the screw clamp 80 and lifting the foot 87 to shorten the support arm 18. The support arm is pivoted upwardly, and the latch bar 90 is inserted into the pocket 128 to secure the support arm in the horizontal positioning. The other support arm is similarly stowed. As the support arms 18 are pivoted to the stowed position, the support hooks 83 engage and rest on the pins 174 to lift the roller tube 15, thereby automatically securing the roller tube 15. The awning is then ready for travel. In the FIG. 2A embodiment, the support arms 18 are shifted outwardly to lock the roller at the wall. In the embodiments of FIGS. 2B and 2C, the support hook 83 causes engagement of the corresponding hooks to lock the roller at the wall.

The present disclosure describes several embodiments of the invention, however, the invention is not limited to these embodiments. Several of the features described represent improvements over the prior art. Awning assemblies known in the prior art can be modified or adapted to use some or all of these features as will be apparent to one skilled in the art. Other variations of the basic design are also contemplated to be within the spirit and scope of the invention and appended claims.

What is claim is:

1. An improved awning assembly, comprising:

an elongated, horizontally movable roller extending generally horizontally along a generally vertical wall;

an awning having a leading edge attached to the roller and a trailing edge attached to the wall, said awning being rolled on the roller and adapted to be unrolled from the roller to an extended position;

a pair of rafter arms each being disposed between the trailing edge and the leading edge so as to hold the roller a selected distance from the wall when the awning is extended; and a pair of support arms pivotably attached at the roller and adapted to support the roller when the awning is extended;

wherein the improvement comprises:

the support arms being pivotable to a generally horizontal stowed position adjacent the roller; and a support hook extending from each support arm adapted to rest on a corresponding projection at the wall in the stowed position so as to prevent lateral movement of the roller.

2. An awning assembly according to claim 1, further comprising a latch on each support arm to secure the support arm in the stowed position.

3. An awning assembly according to claim 2, wherein the latch comprises a latch bar biased so as to project longitudinally from an end of the support arm and a pocket disposed on the wall to receive the latch bar.

4. An awning assembly according to claim 3, further comprising a spring urging the latch bar toward an extended position.

5. An awning assembly according to claim 3 further comprising a handle operatively connected to the latch bar and adapted to move the latch bar to a retracted position.

6. An improved awning assembly according to claim 1 further comprising:

a bracket mounted at the wall and defining a bracket hook;

a roller hook mounted with the roller and adapted for engaging the hook of the bracket; and a support hook disposed at an upper end of each support arm and adapted for pivoting with the support arm and adapted for causing engagement of the roller hook with the bracket hook to retain the roller at the wall.

7. An awning assembly according to claim 6 further comprising a vertically slidable lock bar mounted to the roller and defining the roller hook, said lock bar being movable by operation of the support hook.

8. An awning assembly according to claim 6 wherein the support hook engages a ledge of the bracket to move the roller hook into engagement with the bracket hook.

9. An awning assembly according to claim 1 further comprising a lock bar slidably mounted to the roller and adapted for engaging a bracket mounted at the wall to retain the roller at the wall.

10. An awning assembly according to claim 1, further comprising a case having a top wall and a rear wall and mounted on the vertical wall, said roller being disposed within the case so as to be at least partially enclosed by the case.

11. An awning assembly according to claim 10, further comprising a pair of end covers disposed on end caps of the roller to cover ends of the roller.

12. An awning assembly according to claim 11, wherein the rafter arms are stowed in the case between the roller and the vertical wall and above a longitudinal axis of the roller.

13. An awning assembly according to claim 10 further comprising a rain gutter defined by the case.

14. An awning assembly according to claim 10 wherein the trailing edge of the awning is fastened to the case.

15. Awning assembly according to claim 10 further comprising a cover rollable with the awning so as to define a wall of the cage when the awning is retracted.

* * * * *